US010863853B2

(12) United States Patent
Watanabe

(10) Patent No.: US 10,863,853 B2
(45) Date of Patent: Dec. 15, 2020

(54) LIQUID EXTRACT PRODUCTION SYSTEM AND METHOD FOR PRODUCING LIQUID EXTRACT

(71) Applicant: THE COCA-COLA COMPANY, Atlanta, GA (US)

(72) Inventor: Akira Watanabe, Tokyo (JP)

(73) Assignee: The Coca-Cola Company, Atlanta, GA (US)

( * ) Notice: Subject to any disclaimer, the term of this patent is extended or adjusted under 35 U.S.C. 154(b) by 394 days.

(21) Appl. No.: 15/500,390

(22) PCT Filed: Aug. 3, 2015

(86) PCT No.: PCT/US2015/043450
§ 371 (c)(1),
(2) Date: Jan. 30, 2017

(87) PCT Pub. No.: WO2016/022484
PCT Pub. Date: Feb. 11, 2016

(65) Prior Publication Data
US 2017/0208986 A1  Jul. 27, 2017

(30) Foreign Application Priority Data

Aug. 4, 2014  (JP) .................. 2014-158734

(51) Int. Cl.
A47J 31/24 (2006.01)
A47J 31/02 (2006.01)
(Continued)

(52) U.S. Cl.
CPC ............. A47J 31/02 (2013.01); A23F 5/26 (2013.01); A47J 31/24 (2013.01); A47J 31/44 (2013.01);
(Continued)

(58) Field of Classification Search
CPC ............. A47J 31/02; A47J 31/46; A23F 5/26
See application file for complete search history.

(56) References Cited

U.S. PATENT DOCUMENTS

2005/0095341 A1* 5/2005 Sher .................. A23F 5/243
426/594
2008/0254174 A1 10/2008 Dimitrijevic et al.
(Continued)

FOREIGN PATENT DOCUMENTS

JP  2002320550 A  11/2002
JP  2005-016969 A   1/2005
(Continued)

OTHER PUBLICATIONS

PCT International Search Report and Written Opinion for International Application No. PCT/US2015/043450 dated Nov. 23, 2015.

Primary Examiner — Serkan Akar
Assistant Examiner — Ahmad Abdel-Rahman
(74) Attorney, Agent, or Firm — Eversheds Sutherland (US) LLP

(57) ABSTRACT

A liquid extract production system capable of efficiently producing a liquid extract. The system comprising an extractor for extracting a liquid extract from extraction raw materials, a liquid extract tank for storing the liquid extract, a flow path of liquid extract that connects the extractor and the liquid extract tank, a flow meter for measuring the flow rate of the liquid extract provided in the flow path, a density meter for measuring the solid content concentration of the liquid extract provided in the flow path, a solid content calculation unit for calculating the solid content included in the liquid extract that flowed through the flow path based on the measured flow rate and solid content concentration, and a liquid transfer controller for controlling the transfer of (Continued)

liquid extract from the extractor to the liquid extract tank based on the calculated solid content.

7 Claims, 4 Drawing Sheets

(51) Int. Cl.
    *A47J 31/44*      (2006.01)
    *A23F 5/26*      (2006.01)
    *A47J 31/46*      (2006.01)
    *A47J 31/52*      (2006.01)
    *B01D 11/02*      (2006.01)

(52) U.S. Cl.
    CPC ......... *A47J 31/469* (2018.08); *A47J 31/5255* (2018.08); *B01D 11/02* (2013.01)

(56) References Cited

U.S. PATENT DOCUMENTS

| | | | | |
|---|---|---|---|---|
| 2012/0196009 | A1* | 8/2012 | Casado Gomez | A47J 31/404 426/231 |
| 2014/0079855 | A1* | 3/2014 | Yokoo | A23F 5/262 426/432 |
| 2014/0163247 | A1* | 6/2014 | Buese | B01D 11/0284 544/8 |
| 2015/0289712 | A1* | 10/2015 | Choi | A47J 31/057 99/300 |

FOREIGN PATENT DOCUMENTS

| | | | | |
|---|---|---|---|---|
| JP | 2005016969 | * | 1/2005 | ............ A23F 5/26 |
| JP | 2009-148175 | A | 7/2009 | |
| JP | 2013248166 | A | 12/2013 | |
| WO | 1994/28736 | A1 | 12/1994 | |
| WO | 2014/093573 | A1 | 6/2014 | |

* cited by examiner

LIQUID EXTRACT PRODUCTION SYSTEM AND METHOD FOR PRODUCING LIQUID EXTRACT

CROSS-REFERENCE TO RELATED APPLICATIONS

The present disclosure claims priority to and the benefit of Japanese Patent Application No. 2014-158734, filed 4 Aug. 2014, which is herein incorporated by reference in its entirety.

FIELD OF THE DISCLOSURE

The present disclosure relates to extraction techniques and to a liquid extract production system and a method for producing liquid extract.

BACKGROUND

When a coffee beverage is produced, hot water is poured over pulverized coffee beans in an extractor to extract a liquid extract. Conventionally, when a beverage is produced, after an extraction step, the solid content included in the liquid extract is measured. If the solid content is inadequate, the extraction step is restarted. If the solid content is excessive, the liquid extract is discarded. Disposal of the liquid extract is connected to waste of water used in production, the production time, and the wastewater treatment. Therefore, the conventional method for producing liquid extract is inefficient. In addition, if the liquid extract solid content is inadequate or excessive, a concern is that the flavor and aroma of the liquid extract are affected, and the production of stable products is damaged. Therefore, an objective of the present disclosure is to provide a liquid extract production system and a method for producing liquid extract capable of efficiently producing liquid extract having stable flavor and aroma. Example references include Unexamined Japanese Patent Application No. 2005-16969.

SUMMARY

Some or all of the above needs and/or problems may be addressed by certain embodiments disclosed herein. According to embodiments of the present disclosure, a system for producing liquid extract is provided, comprising: (a) an extractor for extracting liquid extract from extraction raw materials, (b) a liquid extract tank for storing liquid extract, (c) a flow path for the liquid extract that connects the extractor and the liquid extract tank, (d) a flow meter for measuring the flow rate of the liquid extract provided in the flow path, (e) a density meter for measuring the solid content concentration in the liquid extract provided in the flow path, (f) a solid content calculation unit for calculating the solid content included in the liquid extract that flowed through the flow path based on the measured flow rate and solid content concentration, and (g) a liquid transfer controller for controlling the transfer of liquid extract from the extractor to the liquid extract tank based on the calculated solid content.

In the liquid extract production system described above, the density meter may measure the refractive index of the liquid extract. In addition, the density meter may calculate the Brix of the liquid extract based on the measured refractive index.

In the liquid extract production system described above, supply of processing liquid to the extractor may be stopped based on the calculated solid content. In addition, the flow path of the liquid extract may be cut off based on the calculated solid content. Alternately, supply of the processing liquid to the extractor may be stopped based on the calculated solid content, then the flow path of the liquid extract may be cut off.

In the liquid extract production system described above, the extraction raw materials may be coffee beans or tea leaves. Alternately, the liquid extract may be used in beverages, diluted and used as a raw material in beverages for drinking, and diluted and used in concentrates for beverages for drinking.

Additionally, according to embodiments of the present disclosure, a method for producing liquid extract is provided, comprising: (a) extraction of liquid extract from extraction raw materials in an extractor, (b) transfer of the liquid extract through a flow path to a liquid extract tank, (c) measurement of the flow rate of the liquid extract by a flow meter provided in the flow path, (d) measurement of the solid content concentration of the liquid extract in a density meter provided in the flow path, (e) calculation of the solid content included in the liquid extract that flowed in the flow path based on the measured flow rate and solid content concentration, and (f) control of the transfer of liquid extract from the extractor to the liquid extract tank based on the calculated solid content.

In the method for producing liquid extract described above, the density meter may measure the refractive index of the liquid extract. In addition, the density meter may calculate the Brix of the liquid extract based on the measured refractive index.

In the method for producing liquid extract described above, supply of processing liquid to the extractor may be stopped based on the calculated solid content. And the flow path of the liquid extract may be cut off based on the calculated solid content. Alternatively, supply of processing liquid to the extractor may be stopped based on the calculated solid content, then the flow path for the liquid extract may be cut off.

In the method for producing liquid extract described above, the extraction raw materials may be coffee beans or tea leaves. Additionally, the liquid extract may be used in beverages.

According to the present disclosure, a liquid extract production system and a method for producing liquid extract capable of efficiently producing liquid extract can be provided.

Other features and aspects of the systems and methods herein will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Embodiments of the present disclosure are explained below. In the descriptions of the drawings below, the same or similar reference numbers are assigned to the same or similar parts. However, the drawings are schematic drawings. Thus, specific dimensions should be judged in comparison with the following description. Naturally, parts having different relationships and ratios of mutual dimensions even in corresponding drawings are included.

Figure 1:
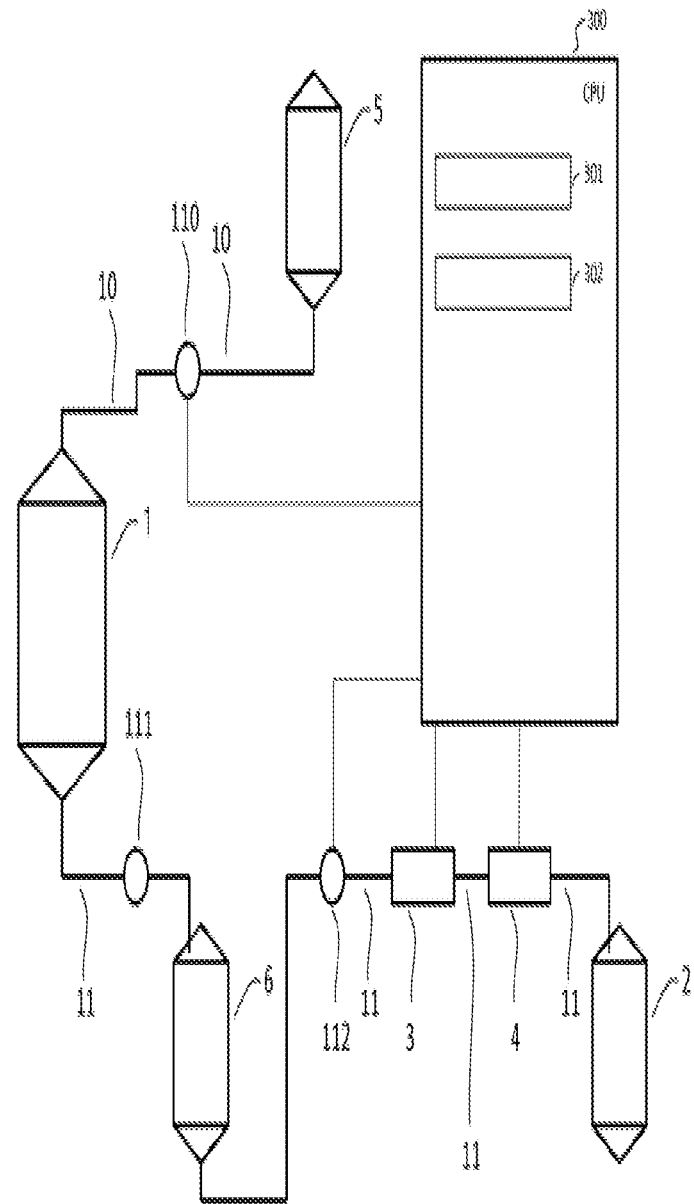
FIG. 1 is a schematic diagram of a liquid extract production system related to an embodiment of the present disclosure.

As shown in FIG. 1, a liquid extract production system related to embodiments of the present disclosure is provided with an extractor 1 for extracting a liquid extract from extraction raw materials, a liquid extract tank 2 for storing the liquid extract, a flow path 11 for the liquid extract that connects the extractor 1 and the liquid extract tank 2, a flow meter 3 for measuring the flow rate of the liquid extract provided in the flow path 11, and a density meter 4 for measuring the solid content concentration of the liquid extract provided in the flow path 11.

Furthermore, the liquid extract production system is provided with a solid content calculation unit 301 for calculating the solid content included in the liquid extract that flowed through the flow path 11 based on measured flow rate and solid content concentration, and a liquid transfer controller 302 for controlling the transfer of the liquid extract from the extractor 1 to the liquid extract tank 2 based on the calculated solid content. For example, the solid content calculation unit 301 and the liquid transfer controller 302 are included in a central processing unit (CPU) 300.

A processing liquid tank 5 is connected through flow path 10 to the extractor 1. The processing liquid tank 5 stores the processing liquid used when the extractor 1 extracts the liquid extract from the extraction raw materials. For example, the processing liquids are cold water and hot water. Cold water and hot water may include pure water, untreated water, or deoxygenated water, and may include solutes. For example, flow path 10 is a pipe. In flow path 10, a liquid transfer pump 110 for transferring the processing liquid is installed in the extractor 1 from the processing liquid tank 5. In addition, a heat exchanger for controlling the temperature of the processing liquid may be installed in the flow path 10.

Figure 2:
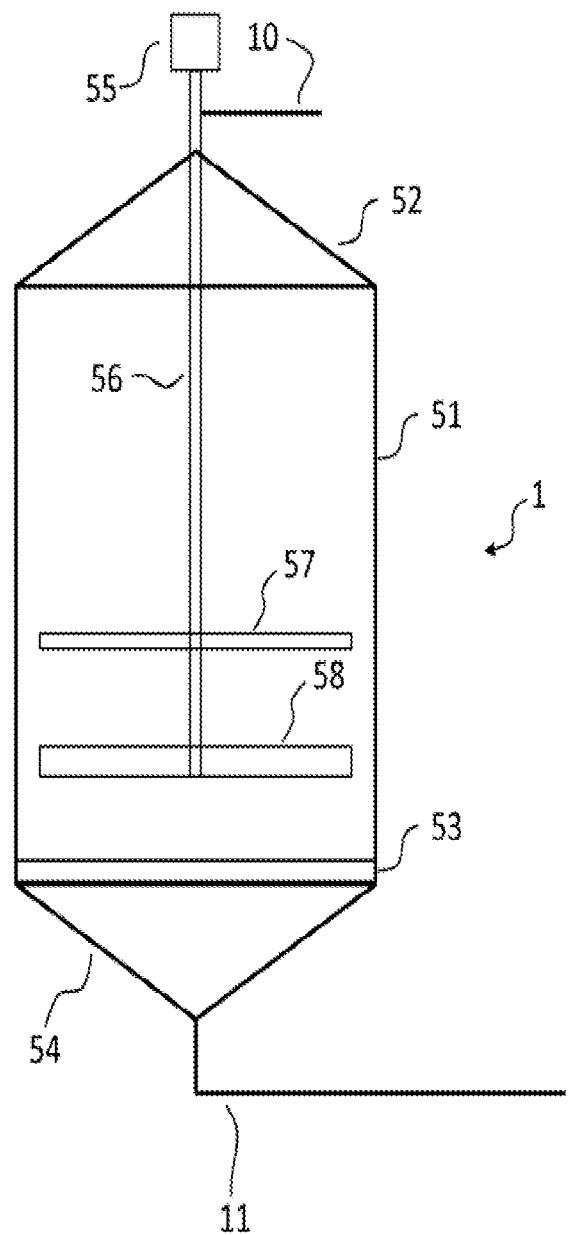
FIG. 2 is a schematic diagram of an extractor related to an embodiment of the present disclosure.

For example, as shown in FIG. 2, the extractor 1 is provided with a cylindrical trunk 51, an upper lid 52 for covering the upper opening of the trunk 51, a filter 53 for covering the lower opening of the trunk 51, and a lower lid 54 for covering the lower opening of the trunk 51 with the filter 53 therebetween. The upper lid 52 and the lower lid 54 tightly seal the upper opening and the lower opening of the trunk 51, respectively. Thus, pressure can be applied to the interior space of the extractor 1 enclosed by the trunk 51, the upper lid 52, and the lower lid 54. However, the application of pressure during extraction is optional, and extraction may be conducted without applying pressure. In addition, when extraction is performed without applying pressure, the upper lid 52 may be left off.

Furthermore, the extractor 1 is provided with a rotary shaft 56 inserted inside of the trunk 51 from the upper lid 52. A rotary vane 58 and a rotary shower nozzle 57 are installed on the rotary shaft 56. The rotary shower nozzle 57 is connected to the flow path 10 of the processing liquid. An elevating rotary drive unit 55 is connected to the rotary shaft 56. The rotary shaft 56 can be rotated by the elevating rotary drive unit 55 and can be moved horizontally and vertically with the sidewall of the trunk 51. Accompanying the rotation of the rotary shaft 56, the rotary vane 58 and the rotary shower nozzle 57 rotate inside of the trunk 51. And accompanying motion in the vertical direction of the rotary shaft 56, the rotary vane 58 and the rotary shower nozzle 57 move in the vertical direction inside of the trunk 51.

As an example of extraction raw materials of the liquid extract, pulverized coffee beans, for example, are distributed on top of the filter 53. The heights of the coffee beans distributed on the filter 53 are made uniform by the rotary vane 58. In addition, the processing liquid is poured from the rotary shower nozzle 57 onto the coffee beans. By pouring the processing liquid onto the coffee beans while the rotary shower nozzle 57 rotates, the processing liquid is uniformly poured onto the coffee beans. The rotary vane 58 is used to agitate the coffee beans immersed in the processing liquid. The liquid extract extracted from the coffee beans with processing liquid poured thereon is stored through the filter 53 in the lower lid 54 that functions as the liquid extract receptacle.

The liquid extract stored in the lower lid 54 is transferred through the flow path 11 to the buffer tank 6 shown in FIG. 1 for temporarily storing the liquid extract. The system may be provided with a liquid transfer pump 111 for transferring the liquid extract from the extractor 1 to the buffer tank 6 in the flow path 11, and transfers liquid under gravity or pressure by the extractor. In addition, a heat exchanger for controlling the temperature of the processing liquid may be installed in the flow path 11 that connects the extractor 1 and the buffer tank 6.

The liquid extract stored in the buffer tank 6 is passed through the flow path 11 to the liquid extract tank 2. For example, the flow meter 3 provided in the flow path 11 is an in-line mass flow meter for measuring the mass of the liquid extract flowing through the flow path 11 per unit time. A Coriolis flow meter, an electromagnetic flow meter, or a thermal mass flow meter may be used. The flow meter 3 measures the mass of the liquid extract flowing through the flow path 11 at, for example, a constant interval, such as every second, while the liquid extract flows through the flow path 11. The flow meter 3 sequentially transfers the measured mass of the liquid extract to the CPU 300.

For example, the density meter 4 provided in the flow path 11 is an in-line refractive index meter for measuring the refractive index of the liquid extract flowing through the flow path 11. The density meter 4 calculates the Brix of the liquid extract flowing through the flow path 11 based on the measured refractive index. The density meter 4 measures the Brix of the liquid extract flowing through the flow path 11 at a constant interval, for example, every second, while the liquid extract flows in the flow path 11. The interval at which the flow meter 3 measures the mass of the liquid extract and the interval at which the density meter 4 measures the Brix of the liquid extract are preferably the same. The density meter 4 sequentially sends the measured Brix of the liquid extract to the CPU 300.

The solid content calculation unit 301 of the CPU 300 receives, for example, the mass of the liquid extract and the Brix of the liquid extract measured at the same time. Furthermore, the solid content calculation unit 301 multiplies the Brix of the liquid extract by the mass of the liquid extract measured at the same time to calculate the solid content included in the liquid extract. In addition, the solid content calculation unit 301 calculates the total of the solid content included in the liquid extract at each time instant while the liquid extract flows in the flow path 11. Thus, the total of the solid content included in the liquid extract transferred to the liquid extract tank 2 can be found in real-time.

The liquid transfer controller 302 of the CPU 300 controls the transfer of the liquid extract from the extractor 1 to the liquid extract tank 2 based on the total of the solid content that flowed through the flow path 11 calculated by the solid content calculation unit 301. For example, the liquid transfer controller 302 controls the liquid transfer pump 110 when the total solid content becomes a first reference value, and stops the transfer of the processing liquid from the processing liquid tank 5 to the extractor 1. Furthermore, when the total solid content becomes a second reference value that is greater than the first reference value, the liquid transfer controller 302 controls a liquid transfer pump 112, cuts off the flow path 11 of the liquid extract, and stops the liquid transfer (discharge) from the extractor 1 or the buffer tank 6 to the liquid extract tank 2. The first reference value is, for example, a value of 60 to 95% of the desired solid content. The second reference value is, for example, a value of 70 to 98% of the desired solid content. However, the values are not limited thereto.

Conventionally, when a beverage is produced, after the extraction step, the total solid content included in the liquid extract stored in the liquid extract tank is measured. If the solid content is inadequate, the extraction step is restarted. If the solid content is excessive, the liquid extract is discarded. Therefore, the conventional method for producing liquid extract is inefficient. In contrast, according to the liquid extract production system related to embodiments of the present disclosure, the solid content included in the liquid extract during the extraction step can be monitored in real-time. Therefore, the liquid extract including the desired solid content value can be produced by stopping the supply of the processing liquid to the extractor 1 and cutting off the flow path 11 of the liquid extract when the solid content is close to the desired value.

For example, a Coriolis flow meter is also a type of machine capable of measuring the mass flow of the measurement target and the Brix from the natural oscillation frequency of the oscillating pipe. However, the present inventors discovered that when air bubbles are contained in the liquid, the Brix cannot be accurately measured by the Coriolis flow meter, but the Brix can be accurately measured by a refractive index meter. Thus, the solid content included in the liquid extract can be more accurately measured by using a refractive index meter as the density meter 4.

Other Embodiments

Although the present disclosure was described above with reference to embodiments, the descriptions and drawings of a portion of this disclosure should not be understood as limiting the present disclosure. From this disclosure, various alternative embodiments, working examples, and practical technologies should be obvious to persons skilled in the art. For example, in the embodiments, coffee beans were given as examples of the extraction raw materials, but various plants, such as cocoa, black tea, barley tea, green tea, oolong tea, and various fruits, can be used as the extraction raw materials when producing beverages. Furthermore, meats, fish, such as dried bonito, dried sardines, and kelp can be used as the extraction raw materials in the production of condiments or the refining of natural compounds. Additionally, in the embodiments, cold water and hot water were given as the processing liquid, but when natural compounds are refined, organic solvents such as alcohol can be used as the processing liquid.

In addition, the flow meter 3 may be placed on the extractor 1 side opposite the density meter 4, or the density meter 4 may be placed on the extractor 1 side opposite the flow meter 3. And the placement of the buffer tank 6 may be omitted. Furthermore, the embodiments show an example in which the liquid transfer controller 302 controls the liquid transfer pumps 110, 112. The liquid transfer controller 302 may control the control valves installed in the flow paths 10, 11, and control the transfer of the processing liquid and the liquid extract. In this case, it should be understood that the present disclosure includes various embodiments not described here.

Working Example 1

Figure 3:
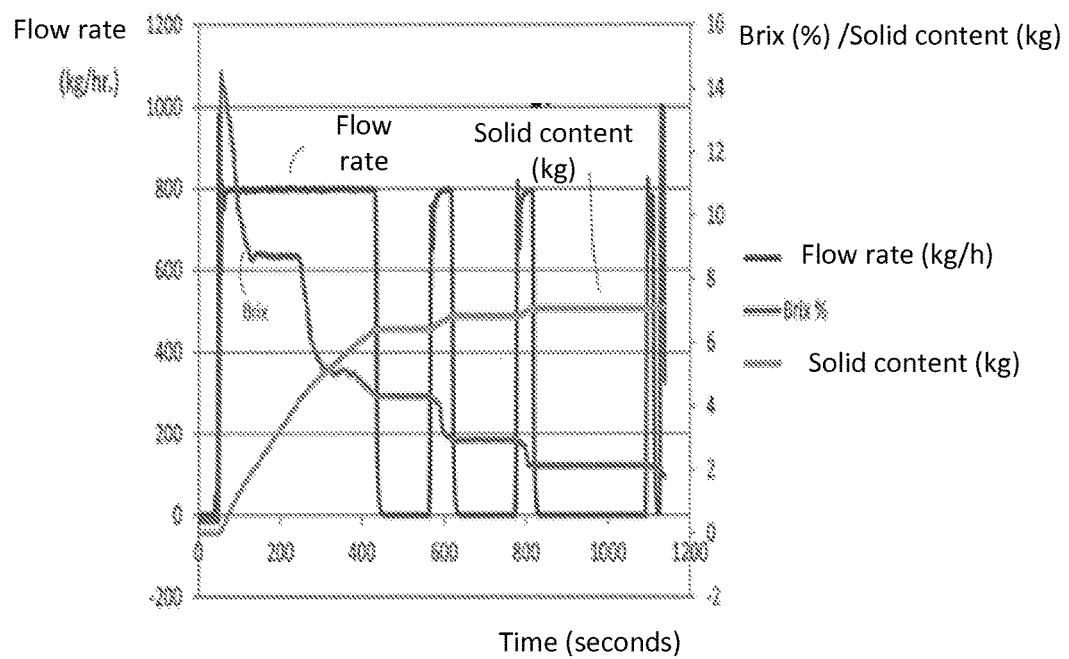
FIG. 3 is a graph showing the total flow rate, Brix, and solid content of coffee liquid extract related to Working Example 1 of the present disclosure.

The liquid extract production system related to a working example of the present disclosure is used to extract the liquid extract from coffee beans with hot water poured thereon. As shown in FIG. 3, the flow rate of the liquid extract (kg/hour) and the Brix (%) of the liquid extract were measured in-line over time, and the solid content included in the liquid extract was measured. The calculated total solid content was 7.12 kg. In contrast, when the solid content of the liquid extract after being stored in the liquid extract tank was measured by a Brix meter, it was 7.13 kg. Thus, the error in the solid content measured in-line was minute.

Working Example 2

Figure 4:
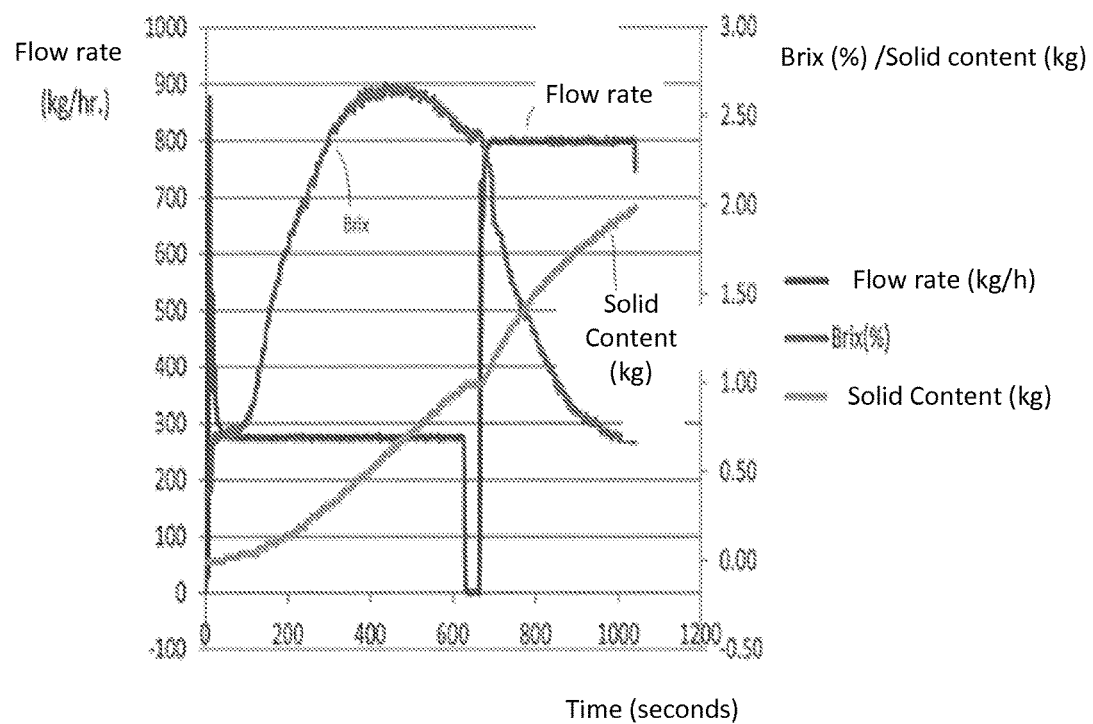
FIG. 4 is a graph showing the total flow rate, Brix, and solid content of tea leaf liquid extract related to Working Example 2 of the present disclosure.

The liquid extract production system related to a working example of the present disclosure was used to extract the liquid extract from tea leaves with hot water poured thereon. As shown in FIG. 4, the flow rate of the liquid extract (kg/hour) and the Brix (%) of the liquid extract were measured in-line over time, and the solid content included in the liquid extract was calculated. The calculated total solid content was 2.00 kg. In contrast, the solid content of the liquid extract after being stored in the liquid extract tank was 2.08 kg when measured by a Brix meter. Thus, the error in the solid content measured in-line was minute.

Working Example 3

When the Brix of the liquid extract flowing through the flow path was measured by the Coriolis flow meter, the Brix value decreased substantially when air bubbles passed through. In contrast, when the Brix of the liquid extract flowing through the flow path was measured by the refractive index meter, a change in the Brix value was not generated even when air bubbles passed through.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A liquid extract production system, comprising:
a processing liquid tank for storing a processing liquid,
an extractor for extracting a liquid extract from extraction raw materials,
a liquid extract tank for storing the liquid extract,
a first flow path of the processing liquid that connects the processing liquid tank and the extractor,
a second flow path of the liquid extract that connects the extractor and the liquid extract tank,
a flow meter positioned in the second flow path for measuring the flow rate of the liquid extract in the second flow path,
a density meter positioned in the second flow path for measuring the solid content concentration of the liquid extract in the second flow path,
a solid content calculation unit for calculating the solid content included in the liquid extract that flowed through the second flow path based on the measured flow rate and solid content concentration,
a first liquid transfer pump positioned in the first flow path for controlling the transfer of processing liquid from the processing liquid tank to the extractor,
a second liquid transfer pump positioned in the second flow path for controlling the transfer of the liquid extract from the extractor to the liquid extract tank,
a liquid transfer controller for (i) controlling the first liquid transfer pump based on the calculated solid content relative to a first reference value of solid content and (ii) controlling the second liquid transfer pump based on the calculated solid content relative to a second reference value of solid content,
wherein when the second reference value of the solid content that is greater than the first reference value of the solid content, the liquid transfer controller is configured to control the second liquid transfer pump to cut off the second flow path and stop liquid transfer from the extractor to the liquid extract tank,
wherein pressure is applied to the interior space of the extractor,
wherein the liquid extract in the second flow path is transferred from the extractor to the liquid extract tank under the pressure,
wherein the density meter measures the refractive index of the liquid extract, and
wherein the density meter calculates the Brix of the liquid extract based on the measured refractive index.

2. The liquid extract production system as claimed in claim 1, wherein supply of processing liquid to the extractor is stopped based on the calculated solid content.

3. The liquid extract production system as claimed in claim 1, wherein the second flow path of the liquid extract is cut off based on the calculated solid content.

4. The liquid extract production system as claimed in claim 1, wherein after the supply of processing liquid to the extractor is stopped based on the calculated solid content, the second flow path of liquid extract is cut off.

5. The liquid extract production system as claimed in claim 1, wherein the extraction raw material is coffee beans or tea leaves.

6. The liquid extract production system as claimed in claim 1, wherein the liquid extract is used in beverages.

7. The liquid extract production system as claimed in claim 1, wherein the extractor comprises:
a trunk enclosed by an upper lid and a lower lid;
a filter disposed on top of the lower lid;
a rotating shaft disposed within the trunk above the filter, wherein the rotating shaft is configured to rotate within the trunk and move vertically within the trunk;
a rotary shower nozzle extending from the rotating shaft above the filter and configured to rotate within the trunk and move vertically within the trunk; and
a rotary vane extending from the rotating shaft between the rotary shower nozzle and the filter and configured to rotate within the trunk and move vertically within the trunk.

* * * * *